United States Patent [19]
Loftin

[11] Patent Number: 5,951,188
[45] Date of Patent: Sep. 14, 1999

[54] AQUEOUS INK PEN

[75] Inventor: Rachel M. Loftin, Halifax, Mass.

[73] Assignee: The Gillette Company, Boston, Mass.

[21] Appl. No.: 08/710,642

[22] Filed: Sep. 18, 1996

Related U.S. Application Data

[60] Continuation of application No. 08/449,716, May 24, 1995, abandoned, which is a division of application No. 08/137,841, Oct. 15, 1993.

[51] Int. Cl.⁶ .................................................. B43K 7/01
[52] U.S. Cl. ............................................. 401/209
[58] Field of Search ............................................ 401/209

[56] References Cited

U.S. PATENT DOCUMENTS

| | | |
|---|---|---|
| 3,266,914 | 8/1966 | Varron . |
| 3,969,264 | 7/1976 | Davis . |
| 4,022,706 | 5/1977 | Davis ..................... 252/299 |
| 4,059,554 | 11/1977 | Pacansky . |
| 4,122,055 | 10/1978 | Tugukuni et al. .............. 260/29.4 UA |
| 4,262,936 | 4/1981 | Miyamoto ............... 282/27.5 |
| 4,289,678 | 9/1981 | Calder et al. .................. 260/33.6 UA |
| 4,297,260 | 10/1981 | Ferree, Jr. et al. . |
| 4,349,639 | 9/1982 | Muller . |
| 4,365,035 | 12/1982 | Zabiak . |
| 4,398,016 | 8/1983 | Homma et al. ....................... 106/29 R |
| 4,410,643 | 10/1983 | Muller . |
| 4,471,079 | 9/1984 | Enami ..................... 523/161 |
| 4,597,794 | 7/1986 | Ohta et al. . |
| 4,742,098 | 5/1988 | Finlayson et al. . |
| 4,776,991 | 10/1988 | Farmer et al. . |
| 4,783,502 | 11/1988 | Faler et al. . |
| 4,816,247 | 3/1989 | Desai et al. . |
| 4,822,769 | 4/1989 | Langlais et al. ......................... 503/214 |
| 4,833,177 | 5/1989 | Faler et al. . |
| 4,855,338 | 8/1989 | Erickson et al. . |
| 4,859,728 | 8/1989 | Schneider et al. . |
| 4,866,096 | 9/1989 | Schweighardt . |
| 4,895,876 | 1/1990 | Schweighardt et al. . |
| 4,900,774 | 2/1990 | Mitsuji ..................... 524/512 |
| 4,902,741 | 2/1990 | Burroway et al. . |

(List continued on next page.)

FOREIGN PATENT DOCUMENTS

| | | |
|---|---|---|
| 0 100 834 A1 | 2/1984 | European Pat. Off. . |
| 0 211 258 A2 | 2/1987 | European Pat. Off. . |
| 0 231 070 A2 | 8/1987 | European Pat. Off. . |
| 0 282 949 A2 | 9/1988 | European Pat. Off. . |
| 0 284 034 A2 | 9/1988 | European Pat. Off. . |
| 0 322 805 B1 | 7/1989 | European Pat. Off. . |
| 0 407 201 A1 | 1/1991 | European Pat. Off. . |
| 29 14 913 | 10/1980 | Germany . |
| 3307743 | 9/1983 | Germany . |
| 55-157668 | 12/1980 | Japan . |
| 135878 | 8/1982 | Japan . |
| 83-152069 | 9/1983 | Japan . |
| 83-176281 | 10/1983 | Japan . |
| 60-203681 | 10/1985 | Japan . |
| 61-57669 | 3/1986 | Japan . |
| 61-168677 | 7/1986 | Japan . |
| 62-333821 | 2/1987 | Japan . |
| 62-256882 | 11/1987 | Japan . |
| 2-28273 | 1/1990 | Japan . |
| 818489 | 8/1959 | United Kingdom . |
| WO 88/00961 | 2/1988 | WIPO . |

(List continued on next page.)

OTHER PUBLICATIONS

Korstvedt et al., American Paint & Coatings Journal, Jan. 28, 1985, pp. 38–40.

Waalk, Science Monitor, Microfluidization.

Washington, Laboratory Equipment Digest, Dispersing problems of emulsion production, Dec. 1987.

Microfluidics International Corporation, Microfluidizer Application Charts.

*Primary Examiner*—Steven A. Bratlie
*Attorney, Agent, or Firm*—Fish & Richardson P.C.

[57] ABSTRACT

A pen containing an emulsion ink is provided. The emulsion ink is formed by mixing an ink precursor and processing the ink precursor in a homogenizer to form an emulsion ink. The ink precursor includes a pigment, water, a film forming polymer, an oil and, preferably, a pH dependent thickener and a base.

13 Claims, 1 Drawing Sheet

U.S. PATENT DOCUMENTS

| | | |
|---|---|---|
| 4,908,154 | 3/1990 | Cook et al. . |
| 4,914,142 | 4/1990 | Takarabe et al. ............ 523/511 |
| 4,929,383 | 5/1990 | Haendler . |
| 4,935,461 | 6/1990 | Nakamura ................ 524/306 |
| 4,954,338 | 9/1990 | Mattox . |
| 4,960,464 | 10/1990 | Chen . |
| 4,981,517 | 1/1991 | DeSanto, Jr. ................ 106/28 |
| 4,985,484 | 1/1991 | Yoshida et al. ............ 524/379 |
| 5,004,763 | 4/1991 | Imagawa ................ 523/161 |
| 5,013,708 | 5/1991 | Nishiyama ................ 503/213 |
| 5,026,427 | 6/1991 | Mitchell et al. . |
| 5,047,084 | 9/1991 | Miller et al. ................ 106/27 |
| 5,075,029 | 12/1991 | Haendler . |
| 5,084,506 | 1/1992 | Faler et al. . |
| 5,114,479 | 5/1992 | Keaveney et al. . |
| 5,116,408 | 5/1992 | Crozer ................ 106/19 |
| 5,120,359 | 6/1992 | Uzukawa et al. . |
| 5,132,271 | 7/1992 | Seitz ................ 503/213 |
| 5,158,849 | 10/1992 | Katsen . |
| 5,168,022 | 12/1992 | Wasmund et al. . |
| 5,210,114 | 5/1993 | Katsen . |
| 5,226,957 | 7/1993 | Wickramanayake et al. . |
| 5,284,894 | 2/1994 | Wasyliw et al. ............ 524/377 |
| 5,284,984 | 2/1994 | Dessau et al. ............ 585/253 |
| 5,328,504 | 7/1994 | Ohnishi . |
| 5,342,440 | 8/1994 | Wickramanayake ........ 106/22 R |
| 5,389,130 | 2/1995 | Batlaw et al. ............ 106/20 R |

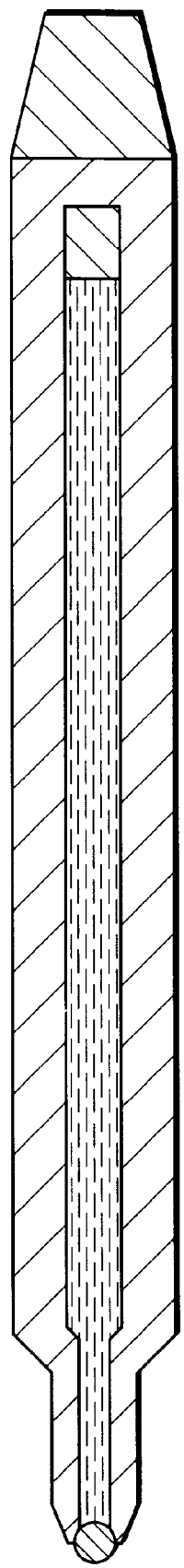
*FIGURE*

AQUEOUS INK PEN

This is a continuation of application Ser. No. 08/449,716, filed May 24, 1995, now abandoned, which is a divisional of application Ser. No. 08/137,841, filed Oct. 15, 1993.

BACKGROUND OF THE INVENTION

The present invention relates to ink compositions for use in pens, particularly ball-point pen inks.

While there are long-recognized advantages to using aqueous inks in ball point pens, the viscosity of these inks must be carefully adjusted in order to avoid flow problems, such as leakage around the ball. To adjust the viscosity, these inks have been thickened with natural gums, e.g., xanthan gum. Inks containing gums, however, often exhibit undesirable performance characteristics, such as blobbing and inadequate ink flow as the ink supply in the pen is depleted. Attempts have been made to overcome blobbing by using a very small ball, but pens having a small ball size tend to have a "scratchy feel" during use.

Aqueous inks also tend to lack smoothness, good writing consistency, and are prone to drying out at the ball tip when the pen is left uncapped.

SUMMARY OF THE INVENTION

The present invention features an aqueous ink which provides good permanency, long cap-off times, high writing intensity, smooth writing characteristics, consistent ink flow and long shelf life.

In one aspect, the invention features a method of making an ink having the aforementioned advantageous properties.

In one aspect, the method includes mixing an ink precursor and processing the ink precursor in a homogenizer, to form an emulsion ink. The ink precursor includes a film forming polymer, a pigment, water, and an oil. Preferred precursors further include a pH dependent thickener, a base and an emulsifier. Advantageously, only low levels of emulsifier are typically necessary, due to the efficacy of the homogenizer in forming a stable microemulsion. In embodiments which include a pH dependent thickener and a base, the film forming polymer may be omitted, although this is not generally preferred, as it tends to reduce the permanency of markings made with the ink.

The homogenizer preferably includes a liquid jet interaction chamber in which the leading edges of a plurality of sheets of a liquid mixture are forced under pressure to impinge in a low-pressure turbulent zone of the liquid. Preferred devices include a plurality of nozzles having elongated orifices to eject under pressure sheets of the liquid, the nozzles being arranged to effect impingement of the sheets along a common liquid jet interaction front. Suitable homogenizers of this type are described in U.S. Pat. Nos. 4,908,154 and 4,533,254, the disclosures of which are incorporated herein by reference.

In another aspect, the method includes mixing an oil and water, processing the mixture in a homogenizer to form an oil-in-water microemulsion, and adding the oil-in-water microemulsion to an ink comprising a film forming polymer, a pigment and water. In more preferred embodiments, the ink further includes a pH dependent thickener and a base, and an emulsifier is added to the oil and water mixture prior to forming the microemulsion.

In another aspect, the invention features an ink composition including a pigment, water, an pH dependent thickener and a base. Preferably, the composition further includes a film forming polymer. Preferred compositions provide good ink flow control, permanence and water resistance.

In a further aspect, the invention features an ink composition including a film forming polymer, a pigment, water, and an oil. This composition provides particularly good writing smoothness, long cap off times, permanence and water resistance.

In preferred embodiments, the ink composition, in addition to a film forming polymer, water, and pigment, includes both an oil and the combination of pH dependent thickener and base. In preferred compositions, the oil is selected from drying and semi-drying oils, and the polymer is an acrylic polymer. These compositions provide a good balance of properties.

The term "pH dependent thickener", as used herein, refers to a material which, when added to a composition, thickens the composition only if the composition has a pH of greater than about 7, preferably between about 8 and 10. These thickeners are also referred to in the art as "associative thickeners". While not being bound by any theory, it is believed that these thickeners cause the viscosity of the ink to increase because the thickener itself swells when contacted by a base.

The term "emulsifier", as used herein, refers to an additive which enhances the ability of a composition to form an emulsion. The term is intended to include surfactants and other conventional types of emulsifiers.

The term "microemulsion", as used herein, refers to an emulsion, i.e., a microscopically heterogeneous mixture comprising minute droplets of a first liquid suspended in a second liquid, in which the suspended droplets have a very small, uniform particle size, typically less than about one micron. The verb "microemulsify", as used herein, refers to processing a solution to form a microemulsion, and "homogenizer" refers to any device capable of forming a microemulsion.

The term "drying oil", as used herein, refers to an oil which crosslinks and forms a dry film by oxidation. The term "semi-drying oil" refers to an oil which slowly thickens as a result of oxidation.

Other features and advantages of the invention will be apparent from the Description of the Preferred Embodiments thereof, and from the claims.

BRIEF DESCRIPTION OF THE DRAWING

The FIGURE is a side view of a pen according to one aspect of the invention.

DESCRIPTION OF THE PREFERRED EMBODIMENTS

A preferred ink includes a film-forming acrylic polymer, a lubricating oil, more preferably a drying or semi-drying oil, a pH dependent thickener, a base, a pigment, an emulsifier, and water. An emulsion ink is formed by pre-mixing these ingredients and processing them through a homogenizer to form a microemulsion.

The acrylic polymer is preferably provided in the form of an emulsion. However, if desired, a water soluble acrylic may be used. A portion of the acrylic polymer may be included with the pigment in a pigment dispersion which contains an acrylic polymer as the medium in which the pigment is dispersed. Preferred acrylic polymers include thermoplastic acrylics, e.g., polymethacrylates, such as polymethyl methacrylate and other methyl acrylates. A preferred acrylic emulsion is RHOPLEX® AC-261 emulsion, available from Rohm and Haas Co., Philadelphia, Pa. RHOPLEX AC 261 is an all-acrylic co-polymer combination, a butyl acrylate/methyl methacrylate blend having a low acid content, a molecular weight of around 1,000,000 and a glass transition temperature of between 15 and 20. Preferred compositions contain from about 5 to 30 weight percent of the acrylic polymer, more preferably from 10 to 20 weight percent. Too much of the acrylic may result in undesirably high viscosity at an effective level of pigment, while too little may result in an ink having poor water resistance when dry.

Suitable drying and semi-drying oils include vegetable oils, e.g., linseed (drying), safflower (drying), cottonseed (semi-drying), and corn (semi-drying), with linseed being preferred. Instead of drying or semi-drying oils, other lubricating oils, e.g., silicones, may be used. These other oils, however, may tend to increase the drying time of the ink. Preferably, the composition contains from about 10 to 25 weight percent of the oil, more preferably about 15 weight percent. The oil imparts both lubricity and good cap-off properties to the ink. Too much oil may cause the ink to dry too slowly, while too little oil may not impart the desired lubricity and cap-off properties. The oil may be added to the ink composition prior to microemulsifying the composition, or the oil and a portion of the water can be separately microemulsified prior to addition to the composition, either in addition to or instead of microemulsifying the entire composition. If the oil and water are separately microemulsified, it is generally preferred that the ratio of oil to water in the microemulsion be from about 1:5 to 2:5.

The pH dependent thickener is preferably an acid stabilized acrylic resin. Suitable pH dependent thickeners are commercially available from Union Carbide under the tradename POLYPHOBE, and ALCO gum thickeners, available from Alco Company. POLYPHOBE 9823 acrylic latex thickener is preferred. Preferably, the composition contains from about 1 to 5 weight percent of the thickener, more preferably about 2 weight percent. Higher levels of thickener may result in undesirably high viscosity, while lower levels may not provide adequate flow control. In embodiments in which the ink composition does not include a film forming polymer, it is typically preferred to use levels of thickener at the high end of the preferred range, to provide adequate viscosity.

In order for the pH dependent thickener to effectively thicken the composition, it is necessary for the composition to have a relatively high pH, e.g., at least 7 and preferably 8 to 10. The pH of the composition may be raised by adding a base, e.g., ammonia or 2-amino-2-methyl-1-propanol (AMP), to the composition as a separate ingredient. Alternatively, the pigment may be provided in the form of a pigment dispersion containing a base, and/or the polymer in the form of a polymer emulsion containing a base, as do the preferred pigment dispersions and polymer emulsions described herein. Preferably, the composition contains a sufficient amount of base, whether provided as a separate ingredient or included in the other components, to raise the pH of the composition to the preferred level.

Enough pigment should be included in the ink to provide an adequate color intensity, but not so much that viscosity becomes excessively high. The preferred inks include between approximately 2% and 10% pigment by weight, more preferably between approximately 4% and 8%. Pigments that may be used in the invention include water dispersible pigments, and preferably the pigment is provided in the form of an aqueous dispersion, for accurate measurement and uniform mixing. Suitable dispersions include those available from Hoechst Celanese under the tradename FLEXONYL or HOSTAFINE, those available from KVK U.S.A. Inc. under the tradename PREDISOL, those available from Heucotech Ltd. under the tradename HEUCOSPERSE, those available from Nippon Keiko Kagaku, Ltd. under the tradename LUMIKOL, and those available from Mikuni Color Works, Inc. under the tradename TITICACA. A preferred pigment dispersion is HEUCOSPERSE III dispersion. The total amount of the pigment dispersion to be added will depend upon the solids level of the dispersion, and will be selected to give an effective amount of the pigment, as described above. It is preferred that the pigment have a relatively small particle size, preferably less than 0.5 micron, to prevent settling. The small particle size also prevents clogging of the pen point.

The emulsifier serves to stabilize the oil-in-water microemulsion. Suitable emulsifiers include most conventional emulsifiers, in particular those suitable for emulsifying vegetable oils. Preferably, the emulsifier is an ethoxylated fatty acid, more preferably ethoxylated oleic acid. Preferably, the composition contains from about 0.5 to 2 weight percent of the emulsifier.

Preferably, sufficient water is included in the ink so that the viscosity of the ink, measured on a Haake CV-100 Rotovisco viscometer, at 300 sec$^{-1}$ and 25° C., is between about 20 cps and 60 cps. If the viscosity is too low, the composition may exhibit excessive ink flow in ball point pens. If the viscosity is too high, the ink may exhibit performance problems, e.g., blobbing, splitting and inadequate ink flow during writing.

Other conventional ingredients may be included in the composition, e.g., biocides and surfactants.

An example of a pen suitable for dispensing the ink described herein is shown in the FIGURE.

A preferred procedure for preparing the preferred compositions, which contain an oil, is to provide the pigment in the form of a dispersion and the acrylic in the form of an emulsion, premix these and the other ingredients of the composition, and pass the resulting mixture through a homogenizer which includes a liquid jet interaction chamber, such as that commercially available from Microfluidics, Newton, Mass., under the tradename MICROFLUIDIZER Model M-110Y at approximately 8000 psi. Other types of homogenizers may be used, provided they are capable of forming a microemulsion. Preferably, the microemulsion is cooled to approximately room temperature, e.g., by passage through cooled coils, after it leaves the liquid jet interaction chamber. Multiple passes through the homogenizer may be desired in order to obtain a microemulsion having optimal stability.

In an alternate embodiment, only the oil and water (and, preferably, an emulsifier) are microemulsified, using the same microemulsifying procedure described above. The resulting oil-in-water microemulsion is then mixed with the other components of the composition using conventional mixing techniques.

Compositions of the invention which do not contain an oil need not be microemulsified, but can instead be mixed using conventional techniques.

In compositions which contain a pH dependent thickener and a base (with or without an oil), it is preferred that the pH dependent thickener alone be premixed with water (or water and any acidic to neutral pH ingredients) before exposure to the base and/or any ingredients having a basic pH. If added directly to a solution having a basic pH, without prior dilution in water, the pH dependent thickener may tend to agglomerate or clump.

EXAMPLE

An ink composition was prepared having the formulation shown in Table 1. The composition was prepared using the following procedure. First, an oil-in-water microemulsion was formed by processing 40 parts linseed oil, 58 parts water, and 2 parts TRYDET 2676 surfactant (emulsifier) through a MICROFLUIDIZER Model M-110Y homogenizer at approximately 8000 psi for 3 passes. Between each pass the exit stream was cooled by passing it through the coils of the homogenizer, which were immersed in an ice water bath. Then, the POLYPHOBE thickener was premixed with a portion of the water, and this mixture was mixed with 37.5 parts of the oil-in-water microemulsion, and the remaining ingredients of the composition, using a laboratory magnetic stirrer. The resulting ink composition was placed in a ball point pen, and used to make markings on a paper substrate. The markings exhibited excellent uniformity and color intensity. The pen itself was observed to have superior writing smoothness.

TABLE 1

| Ingredient | Weight percent |
| --- | --- |
| RHOPLEX AC 261 emulsion | 40 |
| Linseed oil | 15 |
| TRYDET 2676 emulsifier | 0.75 |
| POLYPHOBE 9823 thickener | 2 |
| HEUCOSPERSE III dispersion | 15 |
| SILWET L7001 surfactant | 0.5 |
| TRYFAC 5571 surfactant | 0.5 |
| water | 26.25 |

Other embodiments are within the claims. For example, the inks may be used in other types of pens, e.g., capillary feed rolling ball pens.

I claim:

1. A writing pen comprising an outer body wall defining an ink reservoir, the reservoir containing an ink comprising, in the form of a microemulsion, an oil, a pigment, a film-forming polymer, and water; and a writing tip, constructed to form a marking on a paper substrate, in fluid communication with said reservoir for delivering said ink to a paper substrate.

2. A writing pen comprising an outer body wall defining an ink reservoir, the reservoir containing an ink comprising, in the form of a microemulsion, a pigment, a pH dependent thickener, a base, and water; and a writing tip, constructed to form a marking on a paper substrate, in fluid communication with said reservoir for delivering said ink to a paper substrate.

3. A pen of claim 1 or 2 further comprising a socket disposed at said tip and a ball mounted in said socket.

4. A pen of claim 1 wherein said oil is a drying oil.

5. A pen of claim 1 wherein said oil is a semi-drying oil.

6. A pen of claim 2 further comprising a drying oil.

7. A pen of claim 1 or 6 wherein said oil is a vegetable oil.

8. A pen of claim 1 or 6 wherein a portion of said water and said oil are processed in a homogenizer to form a microemulsion prior to adding said oil to said ink.

9. A pen of claim 2 or 6 further comprising a film forming polymer.

10. A pen of claim 2 further comprising a semi-drying oil.

11. A pen of claim 2 wherein said pH dependent thickener is an acid stabilized acrylic resin.

12. A writing pen comprising an outer body wall defining an ink reservoir, the reservoir containing an ink comprising a film forming polymer, a drying oil, a pigment and water, wherein said drying oil and at least a portion of said water are in the form of an oil-in-water microemulsion; and a writing tip, constructed to form a marking on a paper substrate, in fluid communication with said reservoir for delivering said ink to a paper substrate.

13. A writing pen comprising an outer body wall defining an ink reservoir, the reservoir containing an ink comprising a film forming polymer, a semi-drying oil, a pigment and water, wherein said semi-drying oil and at least a portion of said water are in the form of an oil-in-water microemulsion a writing tip, constructed to form a marking on a paper substrate, in fluid communication with said reservoir for delivering said ink to a paper substrate.

* * * * *